United States Patent Office 3,253,044
Patented May 24, 1966

3,253,044
PROCESS OF HYDROGENATING SULFONATED
LIGNIN TO PHENOLIC SUBSTANCES
David W. Goheen, Camas, Wash., assignor to Crown
Zellerbach Corporation, San Francisco, Calif., a corporation of Nevada
No Drawing. Filed May 3, 1963, Ser. No. 277,715
20 Claims. (Cl. 260—627)

This invention relates to a process of hydrogenating a sulfonated lignin material to produce valuable and useful chemical substances therefrom. More particularly, this invention relates to an improved process of hydrogenating a sulfonated lignin material, such as sulfite spent liquor to produce low molecular weight phenolic substances useful in the manufacture of organic chemicals.

Various methods for the cleavage of lignin materials by hydrogenation have been proposed. Such methods include lignin hydrogenation under very high pressure conditions in the absence of a hydrogenation catalyst or under relatively lower pressure conditions in the presence of a solid catalyst which is maintained in insoluble form as a separate phase during the hydrogenation reaction. All of these known methods, however, suffer the disadvantage that a substantial proportion of the lignin material remains as a residue of the hydrogenation reaction. Furthermore, the methods utilizing an insoluble catalyst have the great disadvantage that the catalyst recovery from the reaction mixture is very difficult thus rendering such methods very expensive.

The main object of this invention is to provide a process of converting sulfonated lignin materials by hydrogenation into useful chemical substances in the presence of a new catalyst which can readily and inexpensively be recovered and reused.

Another object of this invention is to provide a process by which the aforementioned disadvantages of the known methods can be eliminated or substantially reduced and by which valuable phenolic substances can be produced economically on a commercial scale.

Still another object of this invention is to provide an improved lignin hydrogenation process by which a substantially complete conversion of sulfonated lignin material to low molecular weight chemical substances is achieved.

Other objects will appear from the following description of the present invention.

Briefly, the process of this invention is carried out by providing a water-soluble metal salt of ligninsulfonic acid using a metal which possesses catalytic activity under hydrogenation conditions, and subjecting such metal salt of ligninsulfonic acid, in a liquid medium and in the presence of hydrogen gas, to an elevated temperature and superatmospheric pressure for a time sufficient to attain a substantially complete hydrogenation of the lignin material. When the hydrogenation reaction has proceeded to completion, the reaction mixture is cooled and the liquid portion thereof is distilled to give a distillate containing low-molecular weight phenolic substances which can readily be separated from other liquid components of the distillate. The remaining solid residue contains the metal which may be treated with sufficient sulfuric acid to dissolve it. The resulting metal-containing solution may be recovered and reused to provide a new quantity of water-soluble metal salt of ligninsulfonic acid for conversion to further quantities of low-molecular weight phenolic substances.

In carrying out the process of this invention, a sulfonated lignin material obtained from any suitable source such as, for example, sulfite spent liquor, preferably desugared sulfite spent liquor, i.e. a liquor from which a substantial proportion of its carbohydrate content has been removed by any of the conventional procedures, sulfonated alkali lignin, or sulfonated lignin obtained from acid hydrolysis of wood, is treated with a suitable metal under such conditions as to convert the lignin material into a water-soluble salt of ligninsulfonic acid of such metal. This may be accomplished by treating calcium-base sulfite spent liquor with sufficient sulfuric acid to convert a major portion of the calcium ion into calcium sulfate, separating the calcium sulfate by filtration or any other suitable means, thereby producing a solution containing preponderantly free ligninsulfonic acids. It is preferred to employ sufficient sulfuric acid to convert substantially all of the calcium ions to calcium sulfate, thereby producing a solution of ligninsulfonic acids which is substantially free of calcium ions. Thereafter, the solution so produced is admixed with a suitable metal and/or a sulfate thereof which is characterized by having a catalytic activity in the presence of hydrogen and which is capable of forming a corresponding water-soluble salt of ligninsulfonic acid. Examples of metals suitable in the practice of this invention are: iron, cerium, nickel, tin, cobalt, and copper. Other metals having properties similar to those mentioned hereinabove are also suitable for use in the practice of this invention. The metal is preferably admixed with the solution of the ligninsulfonic acids in a finely divided form to facilitate formation of the salt of ligninsulfonic acid. Although the amount of the metal admixed with the ligninsulfonic acid solution should be such as to form a water-soluble metal salt containing at least 1% by weight of the lignin material, it is preferred to employ a stoichiometric amount of the metal so that substantially all of the ligninsulfonic acids are converted to the corresponding metal salt.

In another embodiment of this invention, calcium-base sulfite spent liquor may be admixed directly with a sulfate of any of the foregoing metals, the proportion of the metal in the sulfate with respect to the ligninsulfonic acid being within the same range as set forth hereinabove. Addition of a metal sulfate, such as for instance ferrous sulfate, to calcium-base sulfite spent liquor results in a formation of calcium sulfate which is separated from the solution in the same manner as mentioned hereinabove, thus producing a solution of a water-soluble metal salt of ligninsulfonic acid, such as iron ligninsulfonate.

In another embodiment of this invention, a solution of a water-soluble metal salt of ligninsulfonic acid may be prepared by treating a sulfite spent liquor having calcium, magnesium, sodium, or ammonium as a base with an ion exchange resin to remove a major portion, preferably substantially all of the metal base ions from the liquor and thereby giving a solution of substantially free ligninsulfonic acids which may be admixed with a powdered metal to form a solution of the corresponding metal salt of ligninsulfonic acid.

The metal salt of ligninsulfonic acid provided by any of the foregoing procedures is introduced into a suitable pressure vessel and may be admixed with a lignin solvent, such as a high boiling (above 240° C.) fraction of a lignin tar, hydrocarbons of the aromatic series, such as benzene of naphthalene, phenol, cresols, water, and the like.

In general, the ratio of the lignin solvent to the metal salt of ligninsulfonic acid should be from about 1:1 to 5:1, respectively. The metal salt of ligninsulfonic acid may be admixed with the lignin solvent in the form of an aqueous concentrate, preferably having a 40–55% solids content by weight, or it can first be susbtantially dried and then admixed in the form of dried solids with the lignin solvent.

The resulting liquid mixture is then subjected to the hydrogenation reaction during which hydrogen gas is introduced into the pressure vessel. The initial pressure of the hydrogenation reaction is at least 500 pounds per square inch of hydrogen, preferably between 1000 and 2000 pounds per square inch of hydrogen. The hydrogenation reaction is carried out at a temperature between about 300° C. and about 500° C. preferably between 350° C. and 450° C. for a time sufficient to effect a substantially complete hydrogenation of the sulfonated lignin material. Although the reaction time may vary to a certain extent depending on the temperature and pressure conditions, in general the hydrogenation reaction is complete within a time limit ranging from 30 minutes to 10 hours, preferably from 1 hour to 3 hours.

After the hydrogenation reaction has ended, the reaction mixture is cooled to a temperature below the boiling point of the reaction mixture, preferably to room temperature. After cooling, the liquid portion of the reaction mixture is separated from the solid residue by any suitable means, such as distillation using any conventional distilling apparatus. It is preferred to apply a fractional distillation, so that the desired fraction containing primarily the low-molecular weight phenolic substances may be obtained in one step.

The solid residue of the reaction remaining in the vessel and containing substantially all of the metal originally introduced in forming the salt of the ligninsulfonic acid is treated with sufficient sulfuric acid to insure that substantially all of the metal is dissolved. The resulting metal-containing solution may be recovered and admixed with a new quantity of calcium-base sulfite spent liquor, thereby providing a new quantity of water-soluble metal salt of ligninsulfonic acid to be used in a subsequent hydrogenation reaction.

Accordingly, in contrast to previously proposed methods, substantially the entire amount of the metal catalyst can readily be recovered and reused, so that the present cyclic process may be carried out without further additions of the metal, except to compensate for possible small mechanical losses in the system.

If desired, two or more metals may be employed in the process of this invention in order to promote the formation of monophenols in the reaction products. For instance, it has been found that a powdered mixture of iron and tin in a ratio of 20:1 parts by weight, respectively, gives highly satisfactory results. Also, a mixture of ferrous sulfate with stannous sulfate in the same ratio as set forth hereinabove has been found very satisfactory when applied directly to calcium-base sulfite spent liquor in the manner described hereinabove. The metal catalyst may be elemental metal per se or sulfates thereof.

The presently described process of hydrogenating a sulfonated lignin material is described further in the following examples.

Example 1

To 2500 g. of desugared calcium-base sulfite spent liquor having 6% solids content there was added 18.4 g. of concentrated sulfuric acid. After standing, the preciptated calcium sulfate was filtered and the filtrate treated with 10 g. of powdered iron passing through 200 mesh U.S. Sieve Series. The solution containing iron ligninsulfonate dissolved therein was concentrated to 50.5% solids. 250 g. of the concentrate were treated with 150 g. of a previously stabilized, by hydrogenation, high boiling (above 240° C.) fraction of a lignin tar. The mixture was placed in an autoclave fitted with a stirrer and pressurized to 1600 pounds per square inch with hydrogen. It was then heated with stirring to 405° C. over a period of 1 hour and held at that temperature for 2 hours. The resulting reaction mixture was then cooled to about 30° C. and distilled to give the following fractions:

| Fraction | Boiling Point | Amount, g. |
| --- | --- | --- |
| 1 | Water | 132 |
| 2 | Below 135° C | 14 |
| 3 | 135–170° C | Trace. |
| 4 | 170–240° C | 10.8 |
| 5 | Above 240° C | 167 |
| 6 | Residue | 36.2 |

The residue contained the added iron and some ash from the ligninsulfonic acid. The total yield of distillable organic substances from the sulfonated lignin, i.e., the net amount in excess of the added amount of 150 g. of lignin tar, was 41.8 g. or 39.8% of the net organic content of the sulfonated lignin. Fraction 4 was analyzed by gas chromatography and found to contain the following low-molecular weight phenolic substances: phenol, o-cresol, m,p-cresol, o-ethylphenol, m,p-ethylphenol, o-propylphenol, m,p-propylphenol, 2,6-xylenol, and 2,4-xylenol.

Phenol, o-cresol and m,p-cresol were isolated from the other substances by fractional distillation.

Example 2

To 2500 g. of desugared calcium-base sulfite spent liquor having 6% solids contents there was added 18.4 g. of concentrated sulfuric acid. Calcium sulfate was formed and filtered. The filtrate was treated with 9.8 g. of powdered iron and 1.2 g. of powdered tin. The metals dissolved readily and the liquor was evaporated to 51.2% solids. After evaporation, 269 g. of the concentrate liquor were placed in a 2-liter autoclave equipped with an agitator together with a lignin solvent, i.e. 175 g. of pre-stabilized lignin tar (B.P. above 240° C.). The mixture was pressurized with 1600 pounds per square inch of hydrogen, heated to 428° C. in one hour, held at this temperature for 2 hours, cooled to room temperature and distilled. The following fractions were obtained:

| Fraction | Boiling Point | Amount, g. |
| --- | --- | --- |
| 1 | Water | 146.4 |
| 2 | Below 135° C | 12.5 |
| 3 | 135–170° C | 0.5 |
| 4 | 170–240° C | 18.2 |
| 5 | Above 240° C | 194.8 |
| 6 | Residue | 43.5 |

The residue contained the added metals, i.e. iron and tin, and ash from the sulfonated lignin. The net yield of distillable substances in excess of the added lignin tar was 51 g. or 41% of the organic content of the sulfonated lignin. The analysis of Fraction 4 indicated the presence of the same phenolic substances as obtained in Example 1.

Example 3

To 1500 g. of desugared calcium-base spent liquor having 10% solids content there was added 52.8 g. of ferrous sulfate (FeSO$_4$.7H$_2$O). Calcium sulfate was precipitated, filtered, and the filtrate concentrated to 53.7% solids content. 233 g. of the resulting solution containing iron ligninsulfonate was placed in an autoclave to which 150 g. of pre-stabilized lignin tar (B.P. above 240° C.) was added. The liquid mixture was heated to 405° C. for 1 hour in the presence of 1600 pounds per square inch of hydrogen and held at this temperature for 2 hours with a maximum pressure of 4700 p.s.i. After cooling to room temperature, the liquid contents of the reaction mixture were distilled as in Example 1 to give the following fractions:

| Fraction | Boiling Point | Amount, g. |
|---|---|---|
| 1 | Water | 120.0 |
| 2 | Below 135° C | 13.5 |
| 3 | 135–170° C | 1.5 |
| 4 | 170–240° C | 11.7 |
| 5 | Above 240° C | 156.8 |
| 6 | Residue | 32.3 |

The residue contained the added iron and ash. The net yield of distillable oil in excess of the added lignin tar was 33.5 g. corresponding to 32.2% of the original amount of the sulfonated lignin. The composition of the Fraction 4 was approximately the same as that of the corresponding fraction of Example 1.

*Example 4*

Desugared calcium-base sulfite spent liquor was passed through a "Permutit Q" ion-exchange column to remove the calcium. Then 1500 g. of the resulting de-ionized liquor containing 10% solids was mixed with 10 g. of powdered iron until the metal dissolved. The solution of the iron salt of lignin sulfonic acid was concentrated to 53.8% solids admixed with 150 g. of the same lignin tar as employed in Example 1 and hydrogenated at 1600 pounds per square inch of hydrogen initial pressure for 2 hours at 405° C. in an autoclave. After cooling followed by distillation as set forth in Example 1, the following fractions were obtained:

| Fraction | Boiling Point | Amount, g. |
|---|---|---|
| 1 | Water | 148.0 |
| 2 | Below 135° C | 11.0 |
| 3 | 135–170° C | 0.7 |
| 4 | 170–240° C | 16.2 |
| 5 | Above 240° C | 166.2 |
| 6 | Residue | 30.6 |

The solid residue contained substantially the entire amount of the added iron in admixture with some ash. The net yield of distilled oil in excess of the lignin tar added initially was 44.1 g. or 39.4% of the original amount of the sulfonated lignin.

The composition of Fraction 4 was similar to that of the corresponding Fraction 4 of Example 1.

*Example 5*

Following the procedure of Example 2, calcium-base sulfite spent liquor was treated with cericammonium sulfate and calcium sulfate filtered. The filtrate was concentrated, hydrogenated, and distilled. The following fractions were obtained:

| Fraction | Boiling Point | Amount, g. |
|---|---|---|
| 1 | Water | 132.0 |
| 2 | Below 135° C | 15.0 |
| 3 | 135–170° C | 0.5 |
| 4 | 170–240° C | 18.9 |
| 5 | Above 240° C | 148.9 |
| 6 | Residue | 41.2 |

The residue contained substantially all of the added cerium mixed with a small amount of ash. The net yield of distillable oil in excess of the lignin tar was 33.3 g. or 29.8% of the original amount of the sulfonated lignin. The Fraction 4 had approximately the same composition as Fraction 4 of Example 1.

*Example 6*

Following the procedure of Example 2, calcium was replaced by iron and tin in sulfite spent liquor. Then 260 g. of the resulting liquor containing 49% solids were hydrogenated and distilled to give the following fractions:

| Fraction | Boiling Point | Amount, g. |
|---|---|---|
| 1 | Water | 161.3 |
| 2 | Below 135° C | 6.3 |
| 3 | 135–178° C | 2.0 |
| 4 | 178–240° C | 19.1 |
| 5 | Above 240° C | 151.7 |
| 6 | Residue | 29.0 |

The solid residue contained the added iron and tin in admixture with some ash. The composition of the resulting Fraction 4 was substantially the same as that of Fraction 4 of Example 2.

The solid residue was treated with 19 g. of concentrated sulfuric acid in 80 g. of water and heated to boiling. It was then filtered to separate the insoluble materials. The filtrate containing dissolved iron sulfate and tin sulfate was used to treat a new quantity, i.e. 2500 g. of desugared calcium-based sulfite spent liquor having 6% solids content. The calcium sulfate was filtered. The filtrate was evaporated to 49.2% solids and thereafter 240 g. of the concentrated liquor were admixed with 150 grams of a lignin solvent consisting of 120 g. of pre-stabilized, above 240° C. boiling, lignin tar and 30 g. of a mixture of light oils and higher boiling alkyl phenols derived from the distillate. The mixture was hydrogenated under the same conditions as at the beginning of the cyclic process. After cooling, the distillation of the liquid portion of the reaction mixture gave the following fractions:

| Fraction | Boiling Point | Amount, g. |
|---|---|---|
| 1 | Water | 138.1 |
| 2 | Below 135° C | 13.3 |
| 3 | 135–178° C | 5.4 |
| 4 | 178–240° C | 28.3 |
| 5 | Above 240° C | 133.5 |
| 6 | Residue | 29.2 |

The composition of Fraction 4 was substantially the same as that of the Fraction 4 produced in the first stage of this example.

The residue containing iron and tin was suitable for treatment with sulfuric acid to recover and reuse the metals in the cyclic process.

In similar experiments to those outlined above, iron admixed with small amounts of lead, cobalt, silver, tin, copper, and nickel was used to replace the calcium of sulfite spent liquor and the liquor containing the water-soluble metal salts of ligninsulfonic acid was hydrogenated as described hereinabove. Substantial amounts of low-molecular weight phenolic substances were produced with a very high conversion rate of sulfonated lignin.

Thus it is apparent that by the present invention I have provided an improved process wherein sulfonated lignin materials may be substantially completely converted to low-molecular weight materials containing industrially useful phenolic substances, such as phenol and the cresols. In contrast to previously suggested procedures, the metal employed herein can readily and inexpensively be recovered and recycled to make a continuous process, without additional catalyst usage. Furthermore, the entire volume of sulfite spent liquor from which the metal-base has been removed is utilized, thus preventing the hazard of discharging a part of the liquor with a resultant danger of stream pollution. A further advantage of my process is that sulfonated lignin in its most inexpensive form may be used, inasmuch as no pretreatment aside from filtration of calcium sulfate and water evaporation is required. In addition, the necessity of mixing the lignin with a separate solid phase catalyst is eliminated, and calcium sulfate obtained as a by-product in the process may be recovered and used in various commercial applications.

Having thus described my invention in preferred em- bodiments, I claim as new and desire to protect by Letters Patent:

1. A process of hydrogenating a sulfonated lignin material which comprises:
   (1) reacting a water-soluble metal salt of ligninsulfonic acid in a liquid medium in the presence of hydrogen at a temperature of between about 300° C. and about 500° C. and superatmospheric pressure until hydrogenation of the lignin material is substantially complete, said metal having catalytic activity under hydrogenation conditions and being selected from the group consisting of iron, cerium, nickel, tin, cobalt, and copper;
   (2) cooling the resulting reaction mixture; and,
   (3) distilling the liquid portion of said mixture to produce a distillate containing low-molecular weight phenolic substances while leaving a solid residue containing the metal.

2. The process of claim 1 wherein said solid residue is treated with sufficient sulfuric acid to dissolve the metal and the resulting metal-containing solution is recovered and recycled to provide a new quantity of water-soluble metal salt of ligninsulfonic acid.

3. The process of claim 1 wherein the sulfonated lignin material is sulfite spent liquor.

4. The process of claim 1 wherein the sulfonated lignin material is desugared sulfite spent liquor.

5. The process of claim 1 wherein the metal salt of ligninsulfonic acid employed in step (1) is obtained by treating desugared calcium-base sulfite spent liquor with sufficient sulfuric acid to convert a major portion of the calcium ions into calcium sulfate, separating the calcium sulfate from the liquor and admixing the metal therewith.

6. The process of claim 1 wherein the metal salt of ligninsulfonic acid employed in step (1) is obtained by treating desugared calcium-base sulfite spent liquor with sufficient sulfate of said metal to convert a major portion of the calcium ions into calcium sulfate, and separating the calcium sulfate from the liquor.

7. The process of claim 1 wherein the metal salt of ligninsulfonic acid employed in step (1) is obtained by treating desugared sulfite spent liquor with an ion exchange resin to remove a major portion of metal-base ions from the liquor, and thereafter admixing the metal therewith.

8. The process of claim 1 wherein the metal salt of ligninsulfonic acid provided in step (1) is substantially free of calcium ions.

9. The process of claim 1 wherein the water-soluble metal salt provided in step (1) is in the form of a liquid having about 40%–50 solids content by weight.

10. The process of claim 1 wherein the metal is iron.

11. The process of claim 6 wherein the spent liquor is treated with iron sulfate.

12. The process of claim 1 wherein the amount of the metal present in the water-soluble metal salt is at least 1% by weight of the lignin material.

13. The process of claim 1 wherein an approximately stoichiometric amount of the metal is present in the water-soluble metal salt.

14. The process of claim 1 wherein the metal salt of ligninsulfonic acid provided in step (1) is admixed with a lignin solvent prior to step (2).

15. The process of claim 14 wherein the ratio of the lignin solvent to said metal salt is from about 1:1 to 5:1, respectively.

16. The process of claim 1 wherein the reaction in step (2) is carried out at a temperature between 300° C. and 500° C. and an initial pressure of at least 500 pounds per square inch of hydrogen.

17. The process of claim 1 wherein the reaction in step (2) is carried out at a temperature between 350° C. and 450° C. and an initial pressure between 1000 and 2000 pounds per square inch of hydrogen.

18. The process of claim 1 wherein the reaction mixture is cooled in step (3) to a temperature below the boiling point thereof.

19. A cyclic process of hydrogenating a sulfonated lignin material which comprises the steps of:
   (1) admixing a water-soluble metal salt of ligninsulfonic acid with a lignin solvent in a ratio of from about 1:1 to 5:1, respectively; said metal having catalytic activity under hydrogenation conditions and being selected from the group consisting of iron, cerium, nickel, tin, cobalt, and copper; said metal salt being formed from desugared calcium-base sulfite spent liquor from which substantially all calcium ions have been removed and replaced by said metal ions;
   (2) reacting the resulting mixture in a liquid medium in the presence of hydrogen at a temperature between 350° C. and 450° C. and an initial pressure between 1000 and 2000 pounds per square inch of hydrogen until hydrogenation of the lignin material is substantially complete,
   (3) cooling the resulting reaction mixture to a temperature below the boiling point thereof,
   (4) distilling the liquid portion of the reaction mixture to produce a distillate containing low-molecular weight phenolic substances and a solid residue containing the metal,
   (5) treating the solid residue with sufficient sulfuric acid to dissolve the metal, and
   (6) recovering and admixing the resulting metal-containing solution with a new quantity of calcium-base sulfite spent liquor to provide a new quantity of water-soluble metal salt of ligninsulfonic acid for hydrogenation.

20. The process of claim 19 wherein the metal comprises iron.

References Cited by the Examiner
UNITED STATES PATENTS

| | | | |
|---|---|---|---|
| 2,146,655 | 2/1939 | Sherrard et al. | 260—124 X |
| 2,246,481 | 6/1941 | Adkins et al. | 260—124 |
| 2,390,063 | 12/1945 | Freundenberg et al. | 260—124 |
| 2,870,133 | 1/1959 | Giesen | 260—124 |

CHARLES B. PARKER, *Primary Examiner.*